United States Patent [19]

Sirota et al.

[11] 4,396,739

[45] Aug. 2, 1983

[54] EASY-CLEAN VINYL ACETATE ADHESIVE COMPOSITION

[75] Inventors: Julius Sirota, South Plainfield; Vincent A. Lauria, Somerville, both of N.J.

[73] Assignee: National Starch and Chemical Corporation, Bridgewater, N.J.

[21] Appl. No.: 336,752

[22] Filed: Jan. 4, 1982

Related U.S. Application Data

[63] Continuation-in-part of Ser. No. 194,591, Oct. 6, 1980, abandoned.

[51] Int. Cl.³ .............................................. C08K 3/16
[52] U.S. Cl. .................................. 524/394; 524/395; 524/428; 524/429; 524/437; 524/436
[58] Field of Search ............... 524/394, 395, 428, 429, 524/436, 437

[56] References Cited

U.S. PATENT DOCUMENTS 3,547,750 12/1970 Bussac .................................. 161/66

FOREIGN PATENT DOCUMENTS 1099720 1/1968 United Kingdom .
1286693 8/1972 United Kingdom .
1325351 8/1973 United Kingdom .
1440337 6/1976 United Kingdom .

Primary Examiner—Paul R. Michl
Attorney, Agent, or Firm—Edwin M. Szala; Ellen T. Dec

[57] ABSTRACT

Improved "easy-clean" vinyl acetate homo- and copolymer-based emulsion adhesives are provided by the addition thereto of specific water soluble, ionic salts. Those particular vinyl acetate based adhesives which are formulated for use in remoistening applications are further improved with respect to their "lay-flat" performance.

7 Claims, No Drawings

EASY-CLEAN VINYL ACETATE ADHESIVE COMPOSITION

CROSS REFERENCE TO RELATED APPLICATION

This application is a continuation-in-part of application Ser. No. 194,591 filed Oct. 6, 1980, now abandoned.

BACKGROUND OF THE INVENTION

Improved vinyl acetate homo- and copolymer-based emulsion adhesives characterized by superior "easy-clean" properties are prepared by the addition thereto of specific water soluble, ionic salts. Furthermore, when such salts are added to those emulsions adhesives which are suitable for remoistening applications, the resultant products are also characterized by improved "lay-flat" performance.

Vinyl acetate-based emulsion adhesives are used for a wide range of applications in industry. Typically, they are used in remoistening, stenciling, laminating, packaging and other high speed adhesive applications. It will be recognized that the high speed machining of these adhesives results in the formation of deposits of dried adhesive on the various machine parts which eventually interferes with the machining. Therefore, the need to clean off these deposits quickly and simply with water (a property referred to as "easy-clean") and thereby minimize shut-down time is being emphasized by adhesive users. Heretofore, the "easy-clean" properties have been achieved, for example, by the use of relatively large amounts of polyvinyl alcohol. However, polyvinyl alcohol is expensive and, in some cases, the use thereof may undesirably thicken the adhesive or may react unfavorably with the substrate to be adhered as in the case of "patch-gumming" of polystyrene panels in the manufacture of envelopes.

In a related area, certain vinyl acetate-based emulsion adhesives also require a degree of water-sensitivity in order to provide for remoistenable applications. However, the use of these aqueous emulsions to produce remoistenable adhesives results in the swelling of the paper fibers and eventual curling of the substrate, a problem which is further aggravated upon drying. Attempts have been made to avoid or minimize the curling by the addition of various humectants or plasticizers, however, none, to date, have resulted in the production of a satisfactory "lay-flat" aqueous adhesive. The latter property has been achieved only by passing the curled substrate over knife edges or rollers in order to destroy the continuity of the adhesive film and thereby allow the substrate to resume its flat configuration.

It is therefore an object of the present invention to provide vinyl acetate-based aqueous emulsion adhesives which are characterized by improved easy-clean properties. It is a further object of the invention to provide specific adhesives, which, in addition to possessing easy-clean properties, are also useful as remoistenable adhesives which maintain their lay-flat configuration even after drying.

These and other objects will be apparent from the following description of the invention.

SUMMARY OF THE INVENTION

We have now found that the addition of specific water-soluble, ionic salts to conventional vinyl acetate-based aqueous emulsions produces adhesives characterized by superior "easy-clean" and, in certain cases, "lay-flat" performance.

The specific salts to be utilized herein may be generally classified as hygroscopic, deliquesent, water soluble, ionic salts. Specifically preferred for reasons of effectiveness, concentration, cost and availability are calcium chloride, calcium nitrate, magnesium chloride, magnesium nitrate, aluminum chloride, aluminum nitrate, ammonium chloride, ammonium acetate and potassium acetate. Blends of these salts or mixtures of these salts with other inorganic salts not listed above may also be used in accordance with the spirit and scope of the invention. The amount of the salt used will vary depending upon the specific salt chosen, the vinyl acetate base, as well as the end use for which the system is intended; however, the amount will generally be within the range of 0.5 to 15 parts by weight per 100 parts of the total formulation.

DETAILED DESCRIPTION OF THE PREFERRED EMBODIMENT

Any conventional vinyl acetate based emulsion adhesive may benefit from the use of the salts in accordance with the teachings of the present invention. Formulae for such emulsions are well known in the art and generally include vinyl acetate homopolymer emulsions as well as emulsions of vinyl acetate copolymerized with up to about 50% by weight of a copolymerizable monomer or mixtures thereof. In particular, copolymers of vinyl acetate with ethylene as well as with acrylate and maleate esters are widely used in industrial applications. These emulsions are commercially available or easily prepared and are generally used in the form of aqueous emulsions at about 55% solids levels although higher or lower levels could be employed. In considering the relative amounts of components present in the adhesive compositions of the present invention wherein amounts are based as 100 parts by weight, it will be understood that the water used in the vinyl acetate emulsions is included in all calculations.

It will be recognized that the adhesives herein are formulated in accordance with known techniques and, depending upon the desired use, may include plasticizers such as, for example, polyethylene glycol, dibutyl phthalate, butyl benzyl phthalate, propylene glycol dibenzoate, triethylene glycol polyester of benzoic acid and phthalic acid, alkyd resin plasticizers, etc.; humectants such as glycerin, triethylene glycol, propylene glycol and urea; water soluble polymers or protective colloids and related thickners such as polyvinyl alcohol, polyvinyl pyrrolidine, polyvinyl pyrrolidine-acetate copolymer, polyacrylamide, xanthan gum, etc.; solvents like toluene, 1,1,1-trichloroethane, etc., as well as mixtures of any of the above. Generally the humectants, plasticizers and solvents may be present in amounts varying from 0 to 35 parts per 100 parts of the total composition with the protective colloid or other thickener used in amounts up to about 20 parts. In all cases, however, the total amount of the above described optional additives will represent less than 49.5 parts per 100 parts of the total formulation.

In particular, the vinyl acetate emulsion adhesives suitable for use in remoistening applications will usually contain approximately 5 to 15 parts partially hydrolyzed polyvinyl alcohol, 5–30 parts humectant and 0–5 parts plasticizer per 100 parts total formulation. The alcohol is often used in aqueous solution form, with 40% solutions being the most conventiently made. (The water present in solutions is not included in the calculations herein.)

In addition, other additive known in the adhesive art may also be present in minor amounts. These additive would include, for example, fillers such as clay, chalk; antioxidants such as butylated hydroxyanisole and butylated hydroxytoluene; preservatives such as sodium benzoate and formaldehyde; lubricants; waxes; pigments; dyes; defoamers; flavoring agents; chelating agents; anti-corrosion agents; perfumes; etc.

The resultant adhesive compositions of the present invention are usually employed at solids levels of at least about 30%, preferably 50% or higher, although additional water may be post-added via the addition of protective colloids or in order to adjust the final viscosity for proper machining.

Those skilled in the art will recognize that the specific formulations chosen as well as the choice of additives, if any, will vary depending upon the end use to which the particular adhesive or coating is to be employed.

Adhesives formulated with these specific salts in accordance with the teachings herein may be applied using suitable conventional techniques. The adhesives show no appreciable change in application, machining or adhesive properties while requiring only an effortless cleaning with water of the dried adhesive spills on the machines and other applications apparatus.

It is noted that certain salts, including some of the salts utilized herein, have previously been employed as stabilizers and to prevent "pasting-up" of starch-based adhesives (a premature setting or forming of the adhesive in a storage pot) or to modify soft pressure sensitive polyacrylate and related copolymer emulsions in which the salt serves to crosslink the dried film via carboxyl or other reactive groups on the polymer to give higher cohesive values and insolubility, properties contrary to those required in the present invention. For this reason, adhesive systems containing carboxyl or related functional groups which react with metal ions cannot be employed for use herein. For the same reason, adhesive systems containing externally added cross-linking components such as trizaine, urea-formaldehyde resins, melamine resins, acid rosinates, etc. are also not contemplated herein.

Further details of the invention as well as exemplary formulations will be described below. In the examples all parts are by weight.

EXAMPLE 1

Adhesive formulations were prepared using a vinyl acetate homopolymer emulsion (55% solids) and varying amounts of calcium Chloride in order to show the "easy-clean" properties achieved thereby. Thus, adhesive compositions were formulated as follows:

|  | Samples (parts) | | | |
| --- | --- | --- | --- | --- |
|  | A | B | C | D |
| Vinyl acetate homopolymer emulsion | 100 | 100 | 100 | 100 |
| Calcium chloride | 10 | 5 | 0.5 | — |

The adhesives were tested for cleaning properties by casting 1 ml portions of each formulation on glass plates and allowing the coatings to dry and age 1 week. Drops of water were then put on each film and rubbed comparatively. Samples A, B and C containing the calcium chloride salt disintegrated readily with formulations A and B containing higher amounts of salt disintegrating almost immediately while the control D formulation containing no salt required prolonged rubbing in order to achieve removal.

EXAMPLE 2

Other conventional adhesive formulations based on 55% solids vinyl acetate homopolymer and copolymer emulsions were prepared as follows:

|  | Samples (parts) | | | | | | | |
| --- | --- | --- | --- | --- | --- | --- | --- | --- |
|  | A | B | C | D | E | F | G | H |
| Vinyl acetate homopolymer emulsion | 100 | 100 | 100 | 100 | 100 | 100 | — | — |
| Vinyl acetate-acrylate copolymer | — | — | — | — | — | — | 100 | 100 |
| Butyl benzyl phthalate (Santicizer 160 - Monsanto) | 10 | 10 | 64 | 64 | 44 | 44 | — | — |
| Calcium chloride | 20 | — | — | — | — | — | 5 | — |
| Magnesium chloride | — | — | 18 | — | 18 | — | — | — |
| 1,1,1-Trichloroethane | — | — | — | — | 20 | 20 | — | — |

When tested for cleaning properties, the adhesives designated A, C, E and G were readily removed from the glass plates using only water as described in Example 1. Comparatively, Samples B, D, F and H were not easily removed.

EXAMPLE 3

The adhesive formulation described in Sample A, Example 1 was prepared replacing the calcium chloride with calcium nitrate, magnesium chloride, magnesium nitrate, aluminum chloride, aluminum nitrate, ammonium chloride, ammonium acetate, potassium acetate, a blend of equal parts of calcium chloride and magnesium chloride and a blend of equal parts sodium chloride and calcium chloride. All samples possessed the "easy-clean" characteristic similar to that of the calcium chloride sample.

EXAMPLE 4

The following formulations exemplify adhesives useful for "patch gumming" or stenciling applications such as for window envelope adhesives wherein polystyrene inserts or related films are attached to paper envelopes using high speed stenciling techniques. These adhesives are generally formulated with aqueous vinyl acetate copolymer emulsions containing 5-20 parts plasticizer and 5-35 parts humectant per 100 parts total composition. Optionally, up to about 10 parts solvent and/or up to about 10 parts by weight of a water soluble polymer or thickener may then be added to these compositions.

|  | Samples (parts) | | | | | | | |
| --- | --- | --- | --- | --- | --- | --- | --- | --- |
|  | A | B | C | D | E | F | G | H |
| Vinyl acetate-maleate copolymer emulsion (55% solids) | — | — | 100 | 100 | — | — | 100 | 100 |
| Vinyl acetate-ethylene copolymer emulsion (55% solids) | 100 | 100 | — | — | 100 | 100 | — | — |
| Triethylene glycol polyester of benzoic and phthalic acid (Hercoflex 900, a product of Hercules Chemical Co.) | 23.4 | 23.4 | 24 | 24 | 23.4 | 23.4 | 24 | 24 |
| Xanthan Gum | — | — | — | — | 1 | 1 | — | — |
| 1,1-Trichloroethane | — | — | — | — | — | — | 10 | 10 |
| Glycerin | 28.1 | 28.1 | 64 | 64 | 28.1 | 28.1 | 54 | 54 |
| Magnesium chloride | 3.1 | — | 10 | — | 3.1 | — | 10 | — |

When tested, samples A, C, E and G containing magnesium chloride were readily cleaned with water while samples B, D, F and H which did not contain salt had to be rubbed excessively in order to remove the dried adhesive.

EXAMPLE 5

In a similar manner, various adhesive formulations were prepared which are useful for remoistening applications. Calcium chloride was then added to such systems in order to show the "easy-clean" and additionally, the "lay-flat" properties achieved thereby.

|  | Samples (parts) | | | | | | | | | |
| --- | --- | --- | --- | --- | --- | --- | --- | --- | --- | --- |
|  | A | B | C | D | E | F | G | H | I | J |
| Vinyl acetate homopolymer emulsion (55% solids) | 100 | 100 | 100 | 100 | 100 | 100 | 100 | 100 | 100 | 100 |
| Glycerin | 20 | 20 | 20 | 20 | — | — | 10 | 10 | 20 | 20 |
| 40% Aqueous polyvinyl alcohol solution (88% hydrolyzed) | 20 | 20 | 30 | 30 | — | — | 20 | 20 | 50 | 50 |
| Polyoxyethylene glycol (600 MW) (Carbowax 600-Union Carbide) | — | — | — | — | 14 | 14 | 10 | 10 | — | — |
| Polyvinyl Pyrrolidines/ vinyl acetate (1:1 ratio) | — | — | — | — | 6 | 6 | — | — | — | — |
| An alkyd plasticizer (Resoflex R296 - Cambridge Industries) | — | — | 3 | 3 | — | — | — | — | — | — |
| Calcium chloride | 10 | — | 10 | — | 10 | — | 10 | — | 10 | — |

All the above adhesive samples were coated at 12 lbs./ream on standard gumming stock paper in the machine direction, air dried and permitted to set overnight. Thereafter 6"×4½" (machine direction) cutouts were taken and observed daily (coated side up) for 1 week to observe curl or relative lay flat properties. The examples containing the salt in accordance with the present invention started to exhibit a slight convex curl (considered desirable from a lay-flat aspect); while those samples which did not contain the salt developed a slight concave curl. At the end of one week, those samples with salt were still slightly convex while those control samples without salt were considerably concave, i.e. had excessive curl.

The "easy-clean" test described in Example 1 was also repeated using all the above described formulations with those containing salt exhibiting "easy-clean" properties and those control samples very difficult to clean.

EXAMPLE 6

The formulation described in Sample A of Example 5 was prepared using a variety of salts in place of calcium chloride. Thus formulations were prepared with magnesium chloride, magnesium nitrate, calcium nitrate and a blend of equal parts calcium chloride plus ammonium acetate. When tested as described in Example 5 all formulations possessed the desired "easy-clean" and "lay flat" properties.

The preferred embodiments of the present invention now having been described in detail, various modifications and improvements thereon will become readily apparent to those skilled in the art. Accordingly, the spirit and scope of the present invention is to be considered as limited not by the foregoing disclosure, but only by the appended claims.

We claim:
1. An aqueous adhesive composition, characterized by "easy-clean" properties consisting essentially of per 100 parts by weight total composition:
   (a) 50–99.5 parts of an aqueous vinyl acetate homo- or copolymer emulsion;
   (b) 0.5 to 15 parts of a salt selected from the group consisting of calcium chloride, calcium nitrate, magnesium chloride, magnesium nitrate, aluminum chloride, aluminum nitrate, ammonium chloride, ammonium acetate, potassium acetate and blends thereof;
   (c) 0 to 35 parts humectant;
   (d) 0 to 35 parts plasticizer;
   (e) 0 to 35 parts solvent;
   (f) 0 to 20 parts water soluble protective colloid; wherein the total of components c, d, e and f comprises 0–49.5 parts by weight per 100 parts of the total formulation; and wherein the adhesive contains no carboxyl or related functional groups nor any externally added cross-linking components which can react with the salt.

2. The adhesive composition of claim 1 wherein the emulsion of part (a) is a vinyl acetate homopolymer emulsion.

3. The adhesive composition of claim 1 wherein the emulsion of part (a) is a vinyl acetate - ethylene copolymer emulsion.

4. The adhesive composition of claim 1 wherein the salt of part (b) is calcium chloride or magnesium chloride.

5. An easy-clean aqueous adhesive composition consisting essentially of per 100 parts by weight of the total composition:
   (a) 50–89.5 parts of an aqueous vinyl acetate copolymer emulsion,
   (b) 0.5–15 parts of a salt selected from the group consisting of calcium chloride, calcium nitrate, magnesium chloride, magnesium nitrate, aluminum chloride, aluminum nitrate, ammonium chloride, ammonium acetate, potassium acetate and blends thereof;
   (c) 5–20 parts plasticizer;
   (d) 5–35 parts humectant;
   (e) 0–10 parts solvent; and
   (f) 0–10 parts water soluble polymer or thickener; and wherein the adhesive contains no carboxyl or related functional groups nor any externally added cross-linking components which can react with the salt.

6. A remoistenable adhesive composition characterized by improved "lay-flat" properties consisting essentially of per 100 parts by weight of the total composition:
   (a) 50–89.5 parts of an aqueous vinyl acetate homo- or copolymer emulsion;
   (b) 0.5–15 parts of a salt selected from the group consisting of calcium chloride, calcium nitrate, magnesium chloride, magnesium nitrate, aluminum chloride, aluminum nitrate, ammonium chloride, ammonium acetate, potassium acetate and blends thereof;
   (c) 5–15 parts partially hydrolyzed polyvinyl alcohol;
   (d) 5–30 parts humectant, and
   (e) 0–5 parts plasticizer; and wherein the adhesive contains no carboxyl or related functional groups nor any externally added cross-linking components which can react with the salt.

7. A method for imparting "easy-clean" properties to an aqueous vinyl acetate based emulsion adhesive containing no carboxyl or related functional groups nor any externally added cross-linking components characterized by the step of adding to each 100 parts of the total adhesive base 0.5 to 15 parts of a salt selected from the group consisting of calcium chloride, calcium nitrate, magnesium chloride, magnesium nitrate, aluminum chloride, aluminum nitrate, ammonium chloride, ammonium acetate, potassium acetate and blends thereof.

* * * * *